United States Patent Office 3,009,772
Patented Nov. 21, 1961

3,009,772
PROCESS FOR THE PURIFICATON OF TITANIUM TETRACHLORIDE
Raymond James Wigginton, Luton, England, assignor to Laporte Titanium Limited, Luton, England, a British company
No Drawing. Filed Sept. 20, 1957, Ser. No. 685,084
Claims priority, application Great Britain Sept. 25, 1956
10 Claims. (Cl. 23—87)

It is known to purify liquid titanium tetrachloride containing vanadium as an impurity by heating the tetrachloride with a small proportion of an organic material (see, for example, United States specifications Nos. 2,230,538 and 2,592,021 and British specification No. 656,098). The organic materials used are those which are capable of undergoing carbonisation, probably preceded by polymerisation, in the presence of the titanium tetrachloride under the conditions used, for example, when the impure titanium tetrachloride and the organic material are heated at or above the boiling point of titanium tetrachloride. The vanadium impurity and, when present, certain other metallic impurities, for example, iron and chromium, are taken up by the solid products of carbonisation, and are removed by separating the solid carbonisation products from the liquid titanium tetrachloride, for example, by distilling off the tetrachloride or by filtration or centrifuging.

Organic materials that carbonise slowly, for example, saturated aliphatic hydrocarbons, such as liquid paraffin, are satisfactory as purifying agents only at temperatures above the boiling point of titanium tetrachloride or if a mixture of liquid titanium tetrachloride and the organic material is boiled under reflux for several hours. More readily carbonisable materials, such as vegetable oils or mineral oils containing unsaturated hydrocarbons, have a greater purifying power, but they tend to contaminate the purified product with organic substances which subsequently impart a dark colour to the product when it is distilled. Such contamination is undesirable for some purposes for which the titanium tetrachloride is to be used, for example, for the manufacture of titanium metal.

The present invention provides a process for the purification of titanium tetrachloride containing vanadium as an impurity, wherein the impure liquid titanium tetrachloride is heated with a small proportion of a carbonisable organic material in the presence of a proportion of finely divided metallic sodium amounting to about 5 to 50 percent calculated on the weight of the organic material to bring about carbonisation of the organic material, and the purified titanium tetrachloride is separated from the solid carbonisation products containing the impurities.

The presence of the finely divided metallic sodium has the effect of accelerating the purifying action of the organic material, and therefore enables the throughput of titanium tetrachloride to be purified to be increased and/or the proportion of the organic material, and consequently the amount of waste residue for disposal, to be decreased. Moreover, the extent to which the purified titanium tetrachloride is contaminated with organic matter can be reduced by using organic materials that carbonise slowly and without the long reaction periods that such materials normally require. Furthermore, the quantity of certain other impurities in the final product, such as free chlorine and hydrogen chloride, is less since the sodium reacts with them.

The temperature at which the titanium tetrachloride is heated with the organic material and the metallic sodium is preferably at least 100° C. The heating may be carried out under atmospheric pressure or a higher or lower pressure. Advantageously, the titanium tetrachloride is heated in the liquid state with the organic material and the metallic sodium under atmospheric pressure at a temperature within the range of 100° C. up to the boiling temperature of titanium tetrachloride, viz. 136° C. A convenient method is to boil the titanium tetrachloride under reflux in the presence of the organic material and metallic sodium.

Any organic material capable of undergoing carbonisation when heated in liquid titanium tetrachloride may be used, for example, the materials used in the known processes referred to above. The proportion of the organic material is advantageously within the range of 0.1 to 1.0 percent calculated on the weight of the titanium tetrachloride to be purified. The organic material is advantageously one which, when used alone, is slowly carbonisable, since such materials are generally less costly than the more reactive materials and so greater benefit is derived from the accelerating action of the finely divided metallic sodium. As slowly carbonisable materials there are meant carbonisable saturated or unsaturated organic materials having an iodine value not exceeding 25. Such organic materials are mineral oils, such as crude petroleum oil or petroleum distillates, which are saturated or have a content of unsaturated compounds such that their iodine value does not exceed 25. Alternatively, there may be used vegetable or animal oils, fats or waxes, which do not exceed the aforesaid degree of unsaturation. The iodine values referred to herein are those determined by the iodine monochloride method described in the British Pharmacopaeia, 1953, pages 754–755.

It has been found, for example, that the presence of finely dispersed metallic sodium in a mineral oil in a proportion amounting to 20 percent of the weight of the oil decreases the period of the purification treatment by at least 50 percent as compared with the period required for purification with the mineral oil alone.

The finely divided metallic sodium preferably has a particle size not exceeding 150 microns. It is advantageously used in the form of a dispersion in an organic liquid. Such dispersions and methods of preparing them are known, see, for example, United States specifications Nos. 2,394,608, 2,487,333 and 2,487,334. When the organic dispersing medium is capable of undergoing carbonisation when heated in liquid titanium tetrachloride, as in the case of a mineral oil, it may also serve as the carbonisable organic material used in the present process.

Titanium tetrachloride which has been purified by the process of this invention is very suitable for the manufacture of titanium dioxide or metallic titanium or organic compounds of titanium, and as a catalyst in various processes for polymerising organic compounds.

The following example illustrates the invention:

100 parts by weight of crude liquid titanium tetrachloride containing 0.052 percent of vanadium (calculated as $V_2O_5$) were heated at the boil under reflux with 0.14 part by weight of the mineral lubricating oil having an iodine number of 12, and known in commerce as "Vitrea 69," in which oil 0.04 part by weight of metallic sodium had been finely dispersed in the form of particles of less than 150 microns by agitating molten sodium with the hot oil by means of a high speed stirring device. The refluxing was continued until vanadium could no longer be detected in the vapour above the boiling liquid. The titanium tetrachloride was then distilled off and collected. The purified product contained less than $2.5 \times 10^{-5}$ percent of vanadium (calculated as $V_2O_5$). The refluxing period was 50 minutes.

The above procedure was repeated without the addition of the sodium, and in this case a refluxing period of 135 minutes was required to achieve the same degree of purity.

The procedure described in the first paragraph of the above example was repeated without the addition of the lubricating oil, and with 0.04 part by weight of metallic sodium alone. The metallic sodium was used in the form of a coating on the particles of a dry inert powder. The purification was not complete after refluxing for five hours.

It was also found that traces of impurities, such as chlorine and hydrogen chloride, which were present in some samples of titanium tetrachloride purified by refluxing with the lubricating oil alone, were not present in the samples purified in the presence of the dispersion of sodium in the mineral oil.

I claim:

1. A process for the purification of titanium tetrachloride containing vanadium as an impurity, which comprises heating the impure liquid titanium tetrachloride with a proportion of an organic material carbonizable under process conditions within the range of 0.1 to 1.0 percent calculated on the weight of the impure titanium tetrachloride in contact with a proportion of finely divided metallic sodium within the range of about 5 to 50 percent calculated on the weight of the organic material, such heating being sufficient to bring about carbonization of the organic material while maintaining a pressure sufficient to maintain the titanium tetrachloride in liquid state, and separating the purified titanium tetrachloride from the solid carbonization products.

2. A process as claimed in claim 1, wherein the impure titanium tetrachloride is heated with the organic material and the metallic sodium at a temperature of at least 100° C.

3. A process as claimed in claim 1, wherein the impure titanium tetrachloride is heated with the organic material and the metallic sodium under atmospheric pressure at a temperature within the range of 100° C. to 136° C.

4. A process as claimed in claim 1, wherein the finely divided metallic sodium has a particles size not exceeding 150 microns.

5. A process as claimed in claim 1, wherein the impure titanium tetrachloride is heated with the carbonizable organic material in the presence of a dispersion of the finely divided metallic sodium in an organic liquid.

6. A process as claimed in claim 1, wherein the carbonizable organic material is a carbonizable organic liquid containing the finely divided metallic sodium dispersed therein.

7. A process as claimed in claim 1, wherein the carbonizable material has an iodine value not exceeding 25.

8. A process as claimed in claim 1, wherein the carbonizable organic material is selected from the group consisting of vegetable and animal oils, fats and waxes having an iodine value not exceeding 25.

9. A process as claimed in claim 1, wherein the carbonizable organic material is a mineral oil having an iodine value not exceeding 25.

10. A process for the purification of titanium tetrachloride containing vanadium as an impurity, which comprises heating the impure liquid titanium tetrachloride under atmospheric pressure at a temperature within the range of 100° C. to 136° C. with a mineral oil having an iodine value not exceeding 25 which is present in a proportion within the range of 0.1 to 1.0 percent calculated on the weight of the impure titanium tetrachloride and contains dispersed therein a proportion of about 5 to 50 percent calculated on the weight of the mineral oil of finely divided metallic sodium having a particle size not exceeding 150 microns to bring about carbonization of the mineral oil, and separating the purified titanium tetrachloride from the solid carbonization products.

References Cited in the file of this patent

UNITED STATES PATENTS

| 2,370,525 | De Witt | Feb. 27, 1945 |
| 2,592,021 | Frey et al. | Apr. 8, 1952 |
| 2,594,370 | Warburton | Apr. 29, 1952 |
| 2,754,255 | Stambaugh | July 10, 1956 |
| 2,816,817 | Stein et al. | Dec. 17, 1957 |
| 2,871,094 | Tarsey et al. | Jan. 27, 1959 |

FOREIGN PATENTS

| 744,074 | Great Britain | Feb. 1, 1956 |
| 539,078 | Belgium | July 15, 1955 |

OTHER REFERENCES

Mellor: "Comprehensive Treatise on Inorganic and Theoretical Chemistry," vol. 7, p. 79 (1927), Longmans, Green and Co., New York, New York.

Lange: Handbook of Chemistry, 9th edition, pp. 756–59 (1956), Handbook Publishers Inc., Sandusky, Ohio,